US011845620B2

(12) United States Patent
Morency et al.

(10) Patent No.: US 11,845,620 B2
(45) Date of Patent: *Dec. 19, 2023

(54) TOOL AND METHOD FOR LAYER DEPALLETIZING

(71) Applicant: SYMBOTIC CANADA ULC, Montreal (CA)

(72) Inventors: Sylvain-Paul Morency, Montreal (CA); Marc Ducharme, Montreal (CA); Robert Jodoin, Montreal (CA); Tristan Pashley, Montreal (CA); Francis Levesque, Montreal (CA); Jean-Francois Forget, Montreal (CA)

(73) Assignee: SYMBOTIC CANADA ULC

( * ) Notice: Subject to any disclaimer, the term of this patent is extended or adjusted under 35 U.S.C. 154(b) by 0 days.

This patent is subject to a terminal disclaimer.

(21) Appl. No.: 18/068,800

(22) Filed: Dec. 20, 2022

(65) Prior Publication Data

US 2023/0125374 A1   Apr. 27, 2023

Related U.S. Application Data

(60) Continuation of application No. 16/667,744, filed on Oct. 29, 2019, now Pat. No. 11,535,463, which is a division of application No. 14/720,089, filed on May 22, 2015, now Pat. No. 10,457,502.

(60) Provisional application No. 62/001,676, filed on May 22, 2014.

(51) Int. Cl.
*B65G 59/02* (2006.01)
*B66C 1/32* (2006.01)
*B65G 63/00* (2006.01)
*B66C 1/10* (2006.01)

(52) U.S. Cl.
CPC ............ *B65G 59/023* (2013.01); *B65G 59/02* (2013.01); *B65G 63/002* (2013.01); *B66C 1/10* (2013.01); *B66C 1/32* (2013.01); *B65G 2201/025* (2013.01); *B65G 2814/031* (2013.01)

(58) Field of Classification Search
CPC .... B65G 59/023; B65G 59/02; B65G 63/002; B65G 2201/025; B65G 2814/031; B66C 1/32; B66C 1/10
USPC ........................ 414/796.2, 797; 294/185, 907
See application file for complete search history.

(56) References Cited

U.S. PATENT DOCUMENTS

| 3,822,795 | A | 7/1974 | Salsburg et al. |
| 3,885,686 | A | 5/1975 | Siebring |
| 5,004,401 | A | 4/1991 | Tsubone et al. |
| 5,106,259 | A | 4/1992 | Anderson et al. |
| 6,439,826 | B1 | 8/2002 | Jordan et al. |
| 6,658,816 | B1 | 12/2003 | Parker et al. |
| 6,802,688 | B1 | 10/2004 | Anderson et al. |

(Continued)

FOREIGN PATENT DOCUMENTS

EP      2593387      5/2013

*Primary Examiner* — Lynn E Schwenning
(74) *Attorney, Agent, or Firm* — Perman & Green, LLP

(57) ABSTRACT

The problem of potentially damaging a pallet layer that is gripped by clamps of a depalletizing tool is solved i) by detecting the real position of the layer using a pad on the tool that is movable with the clamps towards the pallet layer and whose detected stopping position determines the real position of the layer, and ii) while the layer is gripped by the clamp, by inserting under the layer curtains; the pressure on the layer by the clamps being adapted to the ease to go underneath the layer.

22 Claims, 14 Drawing Sheets

(56) References Cited

U.S. PATENT DOCUMENTS

| | | |
|---|---|---|
| 7,934,759 B2 | 5/2011 | Weller |
| 8,348,591 B2 | 1/2013 | Perl |
| 8,915,696 B2 | 12/2014 | Baumann et al. |
| 11,535,463 B2 * | 12/2022 | Morency .............. B65G 59/023 |
| 2005/0178091 A1 | 8/2005 | Lasalle |
| 2006/0242785 A1 | 11/2006 | Cawley et al. |
| 2009/0220327 A1 | 9/2009 | Scholtes et al. |
| 2010/0014954 A1 | 1/2010 | Henderson |
| 2012/0045309 A1 | 2/2012 | Christensen et al. |
| 2013/0015675 A1 | 1/2013 | Pickard et al. |
| 2013/0177380 A1 | 7/2013 | Murarotto |
| 2015/0078877 A1 | 3/2015 | Brandmuller et al. |

\* cited by examiner

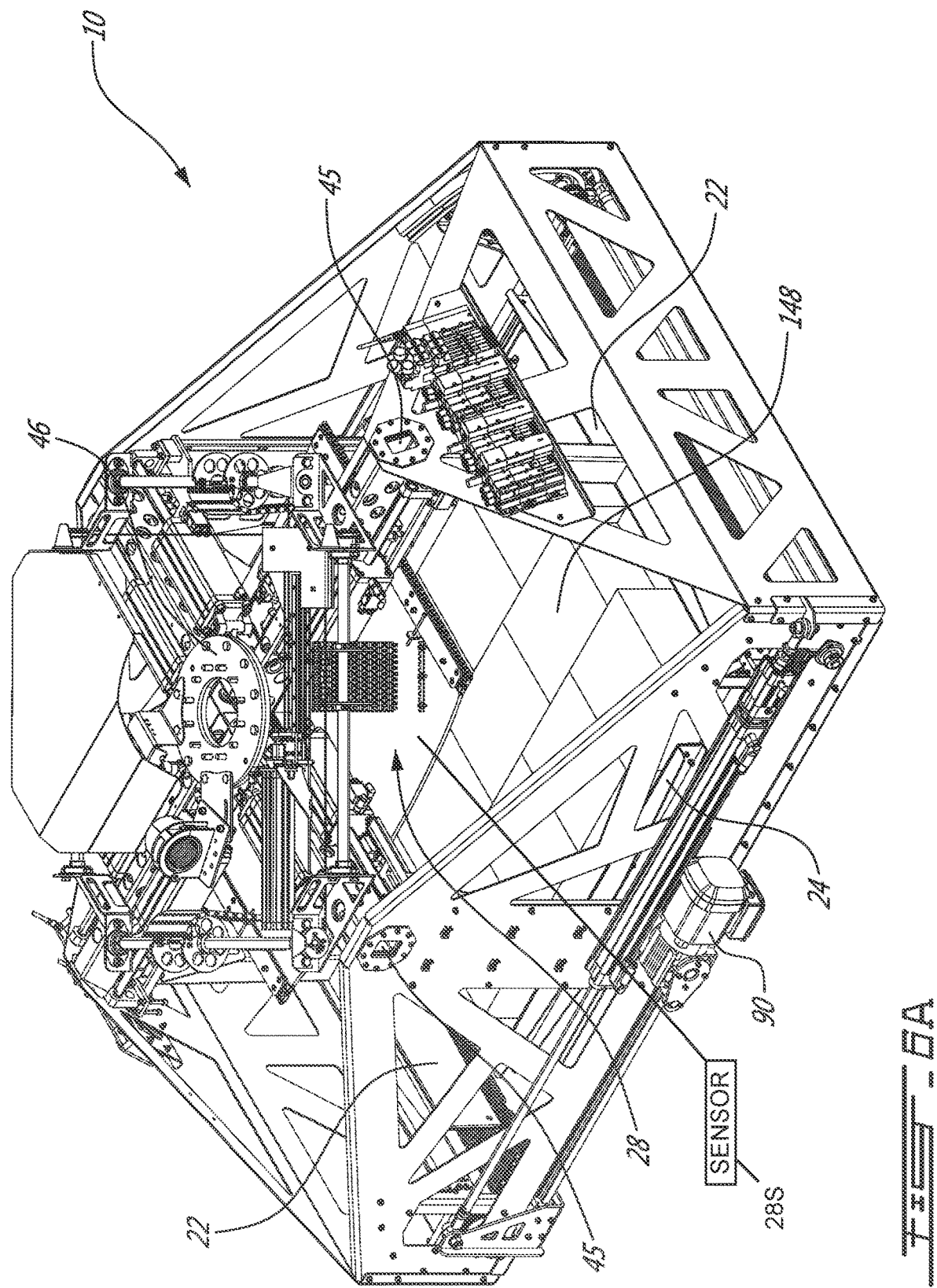

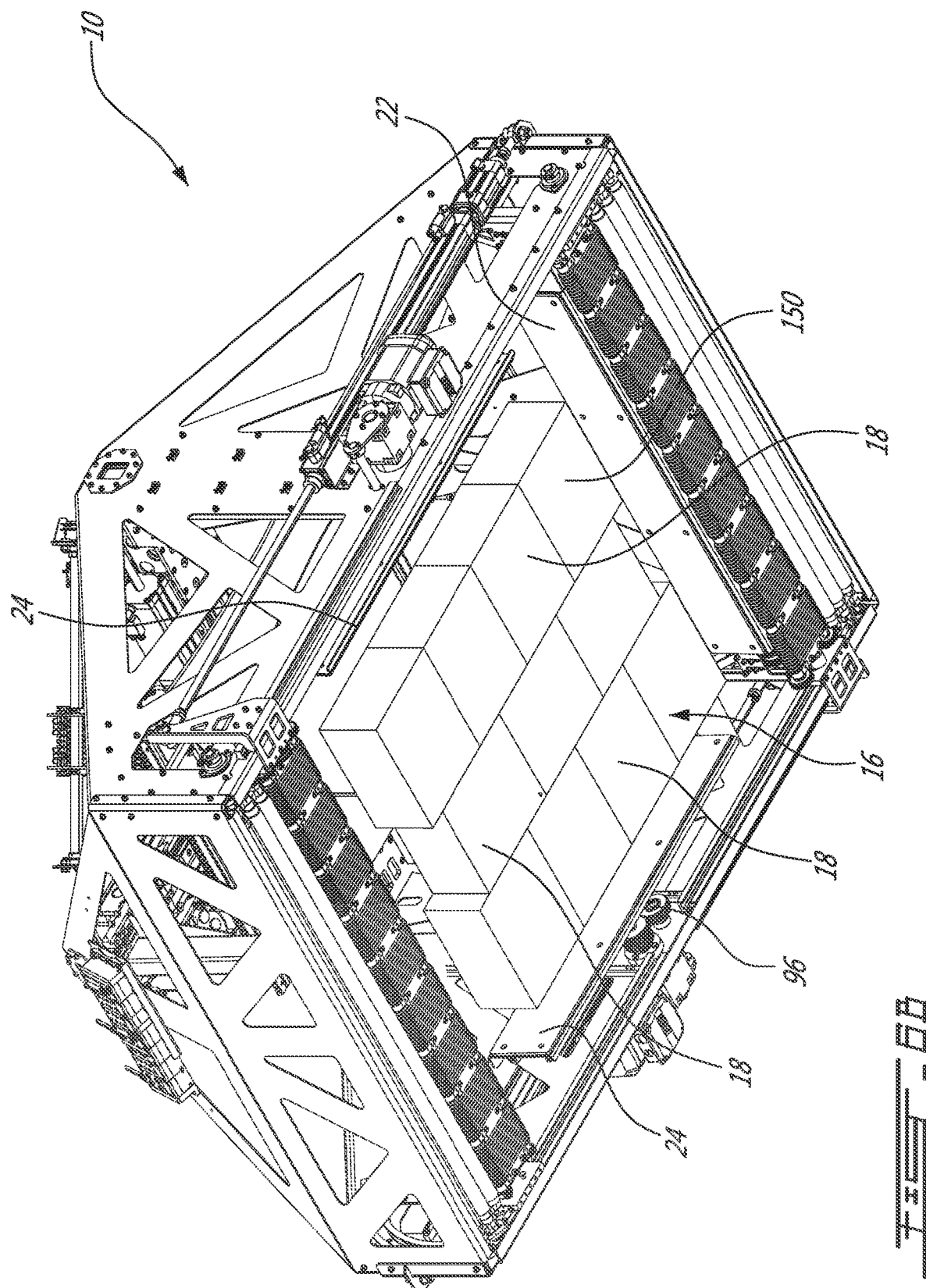

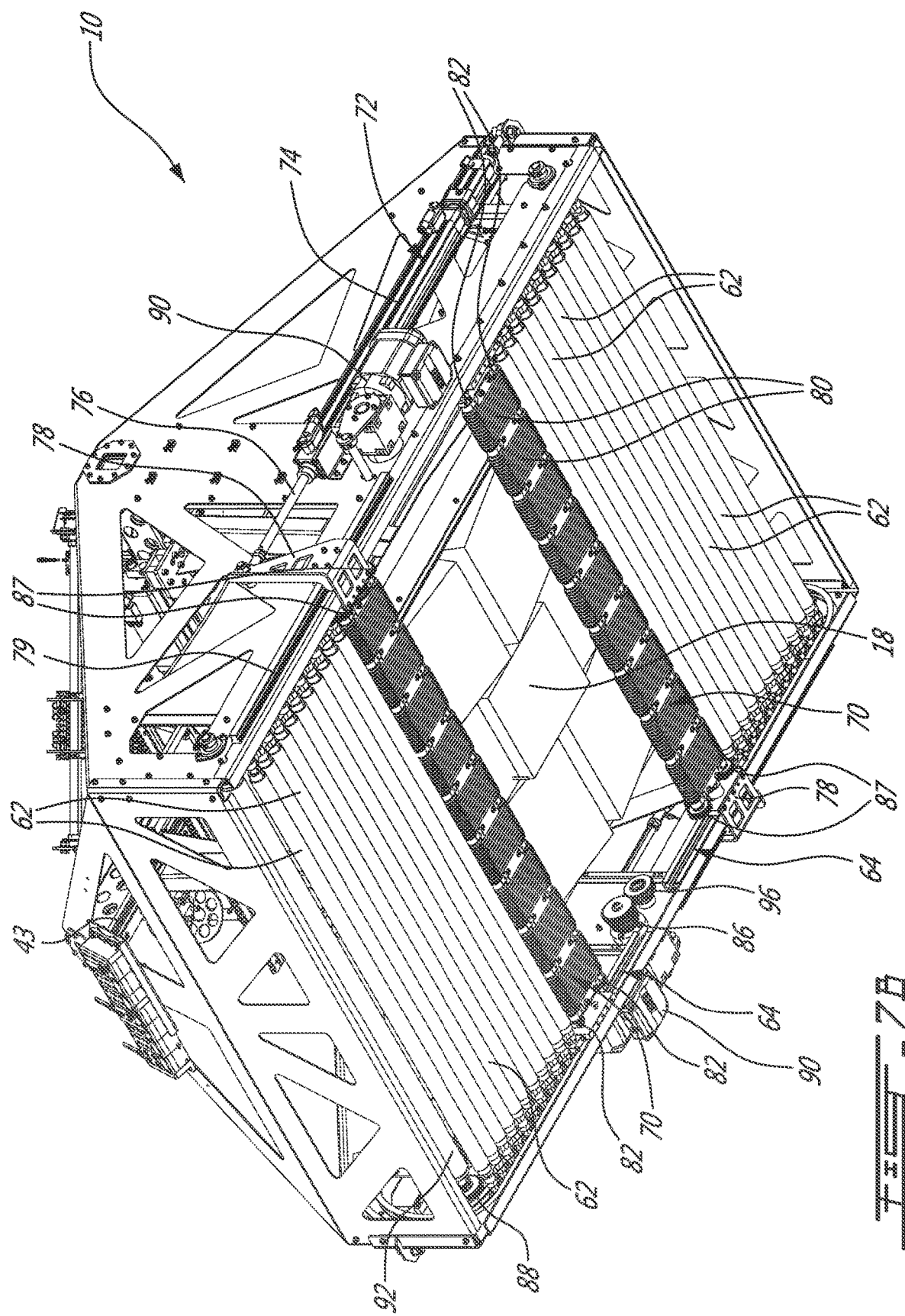

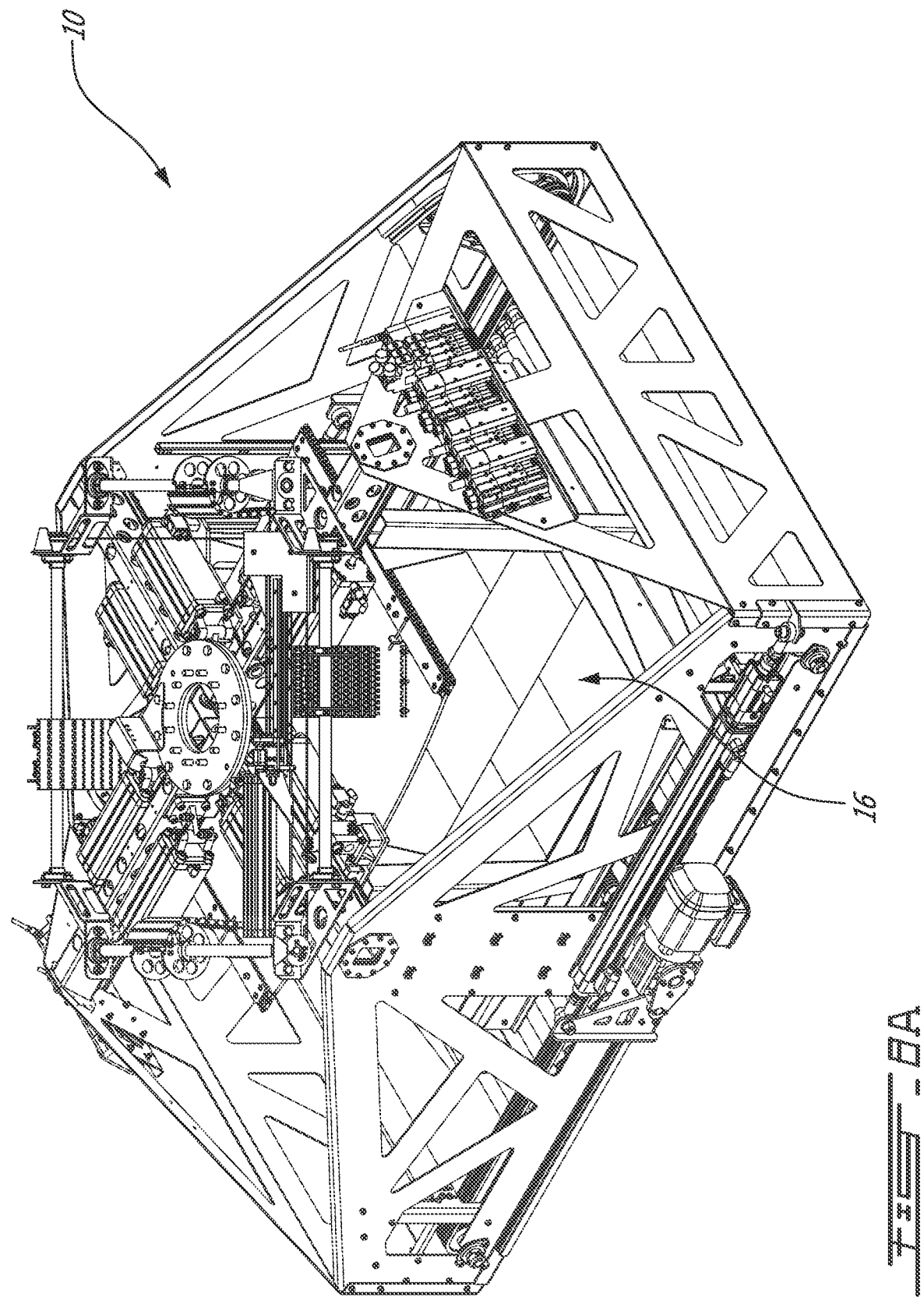

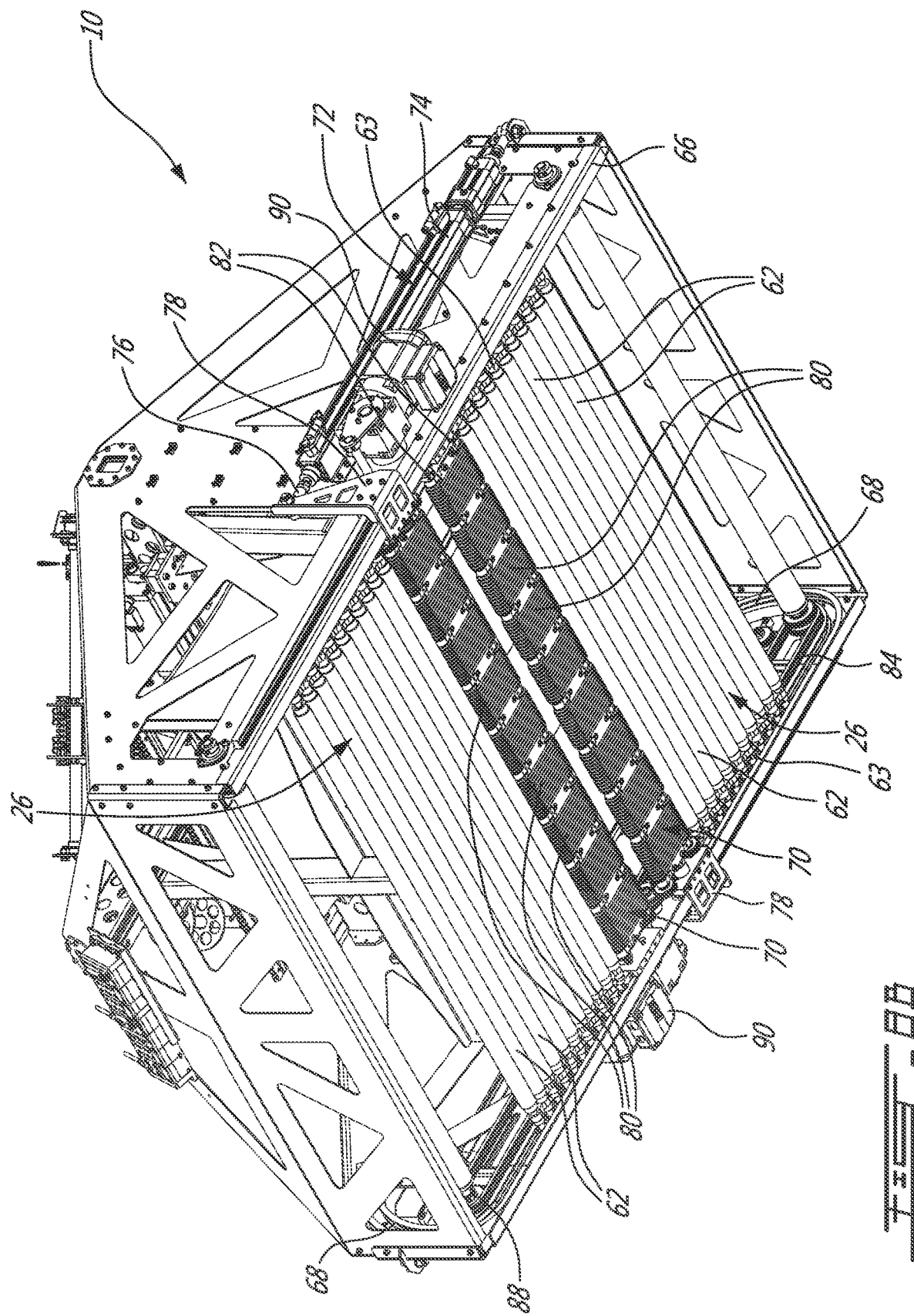

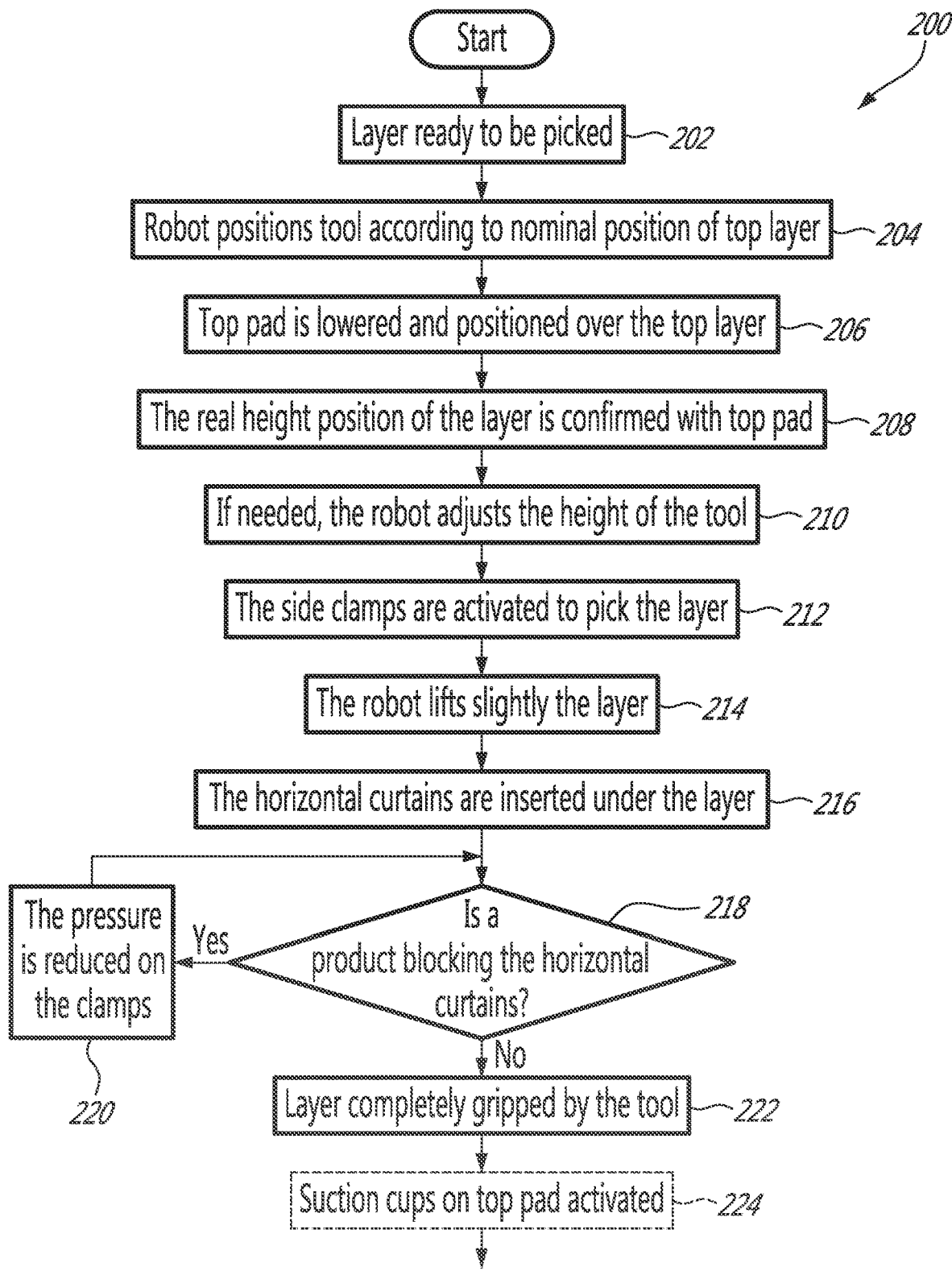

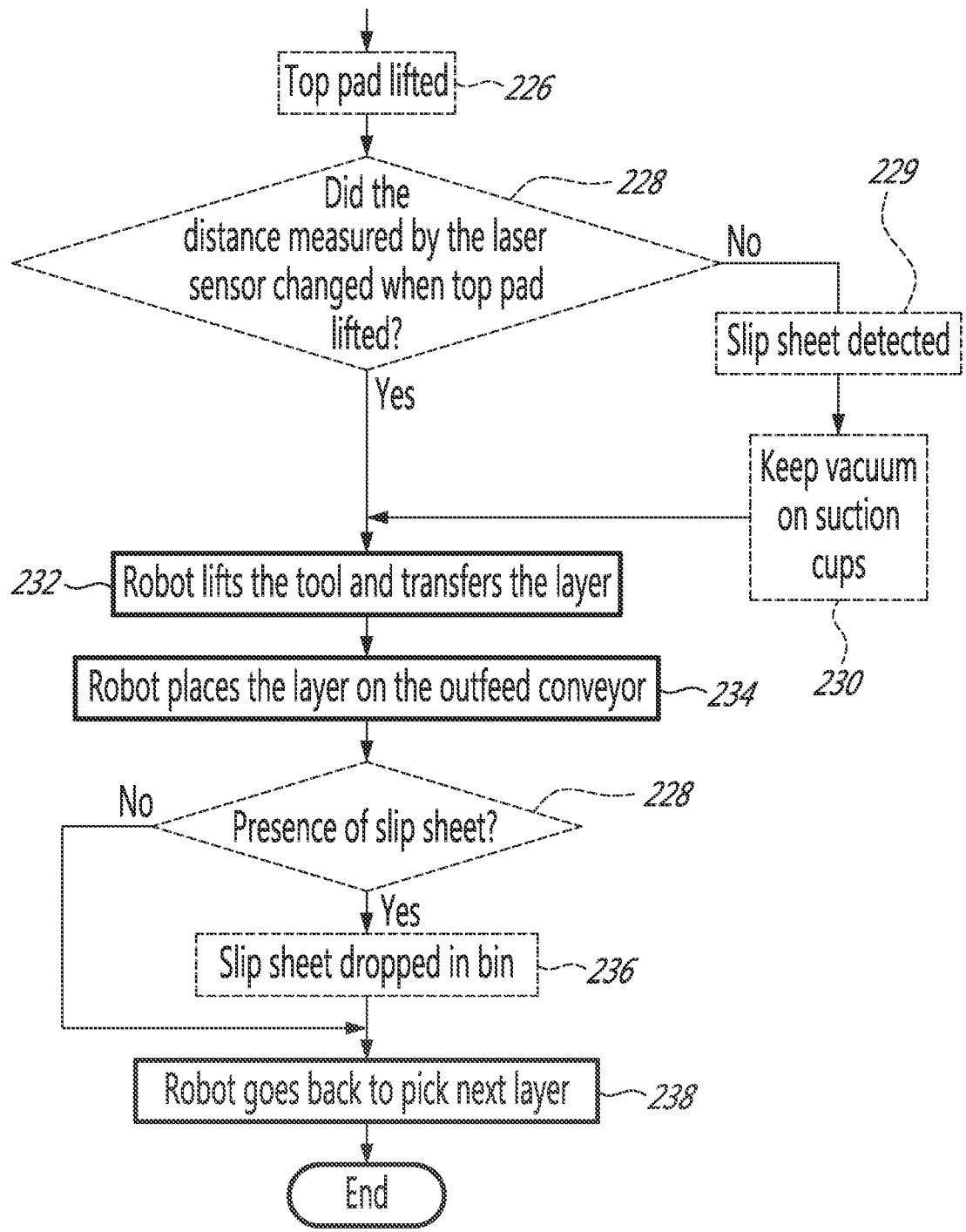
FIG. 9 CONTINUE

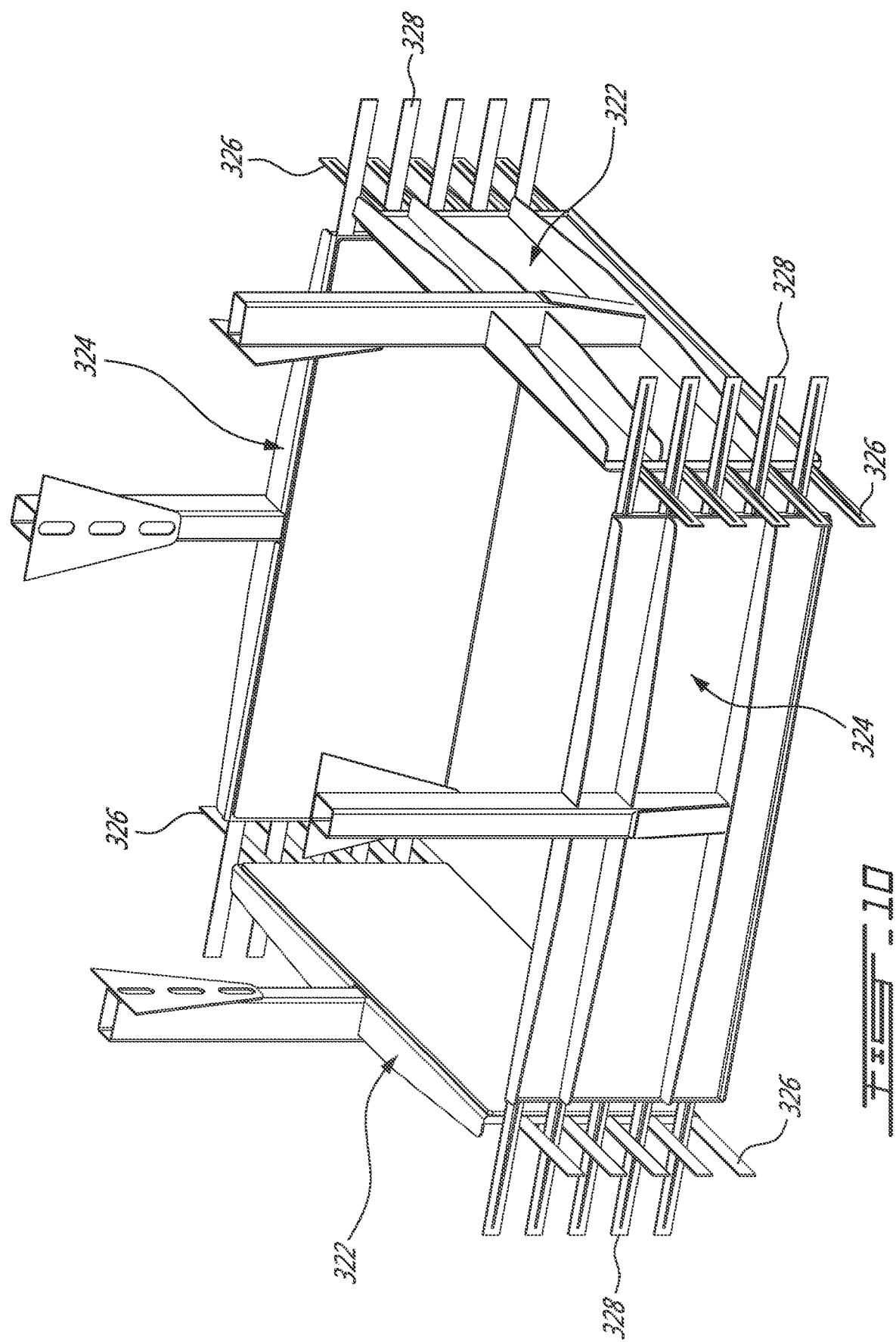

TOOL AND METHOD FOR LAYER DEPALLETIZING

CROSS-REFERENCE TO RELATED APPLICATIONS

This application is continuation of U.S. patent application Ser. No. 16/667,744, filed on Oct. 29, 2019 (Now U.S. Pat. No. 11,535,463 issued on Dec. 27, 2022), which is a divisional of U.S. patent application Ser. No. 14/720,089, filed on May 22, 2015 (No U.S. Pat. No. 10,457,502 issued on Oct. 29, 2019), which application claims priority and the benefit of U.S. Provisional Patent Application No. 62/001,676, filed on May 22, 2014, the contents of which are incorporated by reference herein in their entireties.

FIELD a. The present disclosure related to depalletizing, and more specifically to a tool for layer depalletizing.

BACKGROUND

Distribution centers usually receive full pallets of goods from manufacturers.

Those goods are stored in a warehouse section and are retrieved and palletized according to the retailers' needs. Traditionally, the products were depalettized manually from the full pallets in the inbound area. This task is physically demanding and an automated approach is required for productivity and health & safety reasons.

U.S. Pat. No. 8,915,696 B2 issued on Dec. 23, 2014 to Baumann et al. and being titled "Device and Method for Depalletizing Stacked Bundles" describes a robotized system and method where stacked containers are depalettized.

The depalletizing tool from Baumann possesses a base frame 1 and two underside support base parts 2*a* and 2*b* that can be moved towards and away from one another by means of slide bearings 3*a*, 3*b*. Each support base part includes a roller as a leading edge.

A drawback of the tool from Baumann is that the rollers tend to wear with time, are costly to replace and they have a minimal diameter that can cause a problem when small products have to be picked. Also, this approach relies solely on the friction action of the rollers to insert the movable support member underneath the products. Therefore, if the tool is not precisely positioned at the right height, the rollers could damage the products as they try to lift them with their rotating action.

Also, the tool by Baumann includes light barriers as sensors to position the tool for the depalletizing process. This approach does work well when the products to be depalettized have a regular shape, do not have any open flap, and when all products are nicely stacked. If those conditions are not respected, the use of light barriers can cause false readings yielding a misguiding of the depalletizing device.

Also, the method and tool by Baumann cannot handle the slip sheets that are often inserted between the layers for their separation.

U.S. Pat. No. 7,934,759 B2, issued on May 3, 2011 to Weller and being titled "Packaging System Including Pallet De-Layering System" describes a system and method to handle a layer of multiple palletized products where an interior void is located in the product layer. The system includes void filling members carried by a gripper mechanism that is provided to improve holding the products for de-layering.

The approach taken by Weller only works if there is at least one void in the layer of products, which is too restrictive.

SUMMARY

The problem of potentially damaging a pallet layer that is gripped by clamps of a depalletizing tool is solved i) by detecting the real position of the layer using a pad that is movable with the clamps towards the pallet layer and whose detected stopping position determines the real position of the layer, and ii) while the layer is gripped by the clamp, when inserted under the layer curtains; the pressure on the layer by the clamps being adapted according to the front end ease to go underneath the products.

According to an illustrative embodiment, there is provided a tool for layer depalletizing comprising:
  a frame for mounting the tool to a robot;
  clamps movably mounted to the frame to grip a pallet layer;
  curtains mounted to the frame below the clamps and being movable under the pallet layer while the pallet layer is gripped by the clamps; pressure on the clamps being adjusted depending on a movement resistance of the curtains when the curtains are inserted under the pallet layer.

According to another illustrative embodiment, there is provided a tool for layer depalletizing comprising:
  a frame for mounting the tool to a robot;
  clamps movably mounted to the frame to grip a pallet layer; and
  a pad, mounted to the frame above the clamps, that is transversely movable towards and away a level defined by the clamps, and that defines a reference to determine a height of the pallet layer when the pad is moved towards the pallet layer.

According to still another illustrative embodiment, there is provided a curtain assembly mounted to a layer depalletizing tool under clamps thereof comprising:
  two curtains, each defined by a plurality of rolls mounted in tracks so as to be slidably movable under a pallet layer while the pallet layer is gripped by the clamps; each of the plurality of rolls extending transversally to directions of movement of the curtains; each of the two curtains including a front end equipped with at least one rotatable friction element.

According to another illustrative embodiment, there is provided a method for layer depalletizing comprising:
  positioning clamps around at least one layer to depalletize;
  using the clamps to grip and at least partially lift the at least one layer;
  moving curtains under the at least one layer while monitoring a displacement speed thereof;
  if the displacement of the curtains is indicative of a product blocking the movement of the curtains, then applying less pressure on the clamps;
  moving the layer with the clamps to a selected area, while the curtains are maintained under the at least one layer; and
  at the selected area, removing the curtains from under the at least one layer and the clamps releasing the at least one layer.

According to a further illustrative embodiment, there is provided a method for layer depalletizing comprising:
  determining a real position of a layer by moving a pad towards a top surface of the layer;

positioning clamps around the layer using the real position of the layer;

using the clamps to grip and at least partially lift the layer;

moving curtains under the layer;

moving the layer with the clamps to a first area, while the curtains are maintained under the layer; and at the first area, removing the curtains from under the layer and the clamps releasing the layer.

Illustrative embodiments of the layer depalletizing tool include pressure adjustment of its side clamps to facilitate the gripping of the products located at the center of the layer (i.e. inside those located at the perimeter).

In a layer depalletizing tool according to illustrative embodiments, the top pad allows measuring the height of the top surface of the layer to be picked for precise positioning of the tool. Such a top pad also prevents small products to "pop out" as curtains move underneath the products or when the curtains are opened when the products are placed.

Other objects, advantages and features of the tool and method for depalletizing mixed load products will become more apparent upon reading the following nonrestrictive description of preferred embodiments thereof, given by way of example only with reference to the accompanying drawings.

BRIEF DESCRIPTION OF THE DRAWINGS

In the Appended Drawings:

FIGS. 6A and 6B are respectively top and bottom perspective view of the tool from FIG. 1, shown in position to grip a full pallet layer;

FIGS. 7A and 7B are perspective views similar to FIGS. 6A and 6B respectively, showing the clamps applying pressure on the pallet layer and the curtains being partially closed;

FIGS. 8A and 8B are perspective views similar to FIGS. 6A and 6B respectively, showing the clamps having released some of the pressure on the pallet layer and the curtains being completely closed;

FIG. 9 is a flowchart of a method for layer depalletizing according to a first illustrative embodiment; and FIG. 10 is a perspective of a clamp assembly according to a second illustrative embodiment.

DETAILED DESCRIPTION

Figure 1:
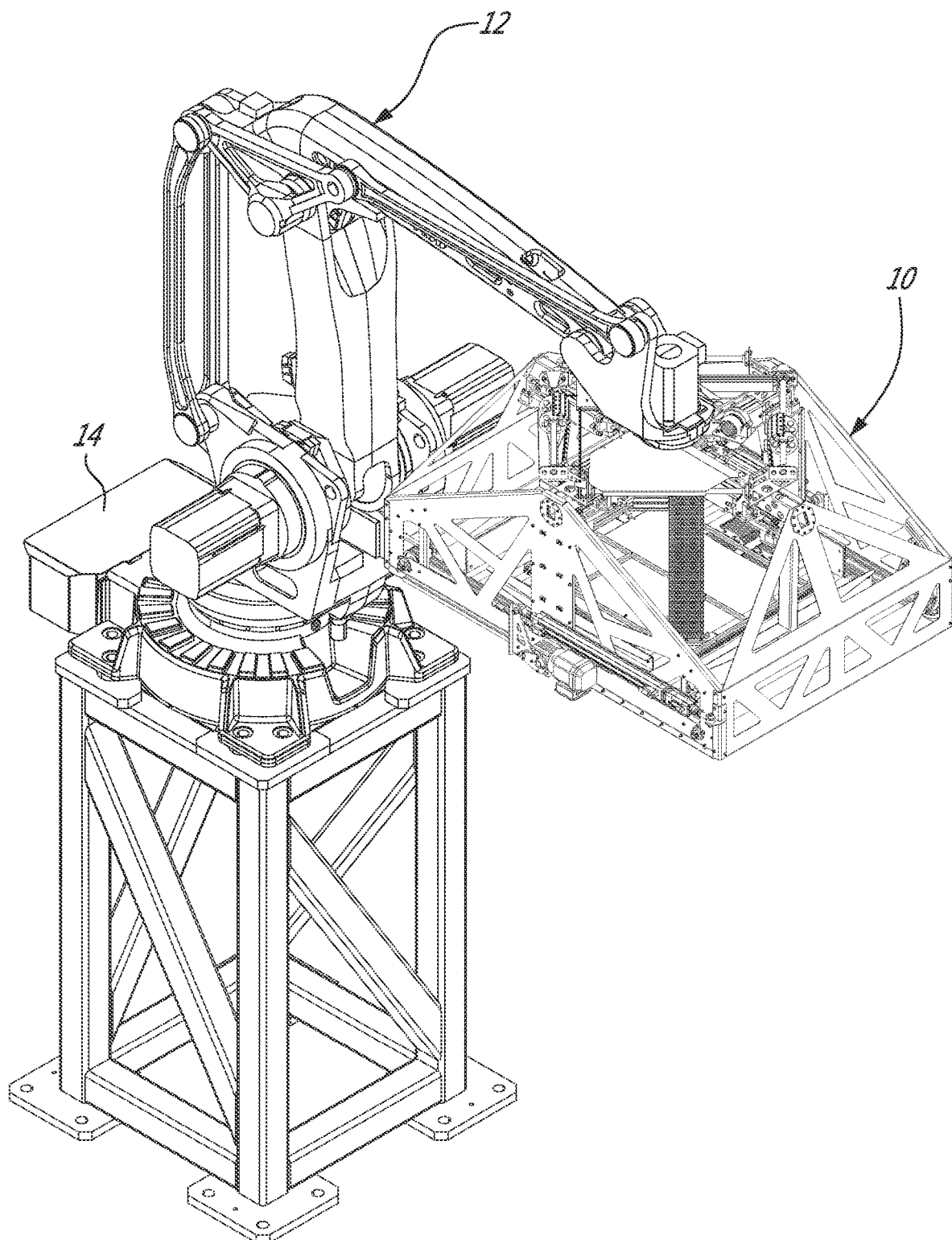
FIG. 1 is a top perspective of a tool for layer depalletizing according to a first illustrative embodiment; the tool being shown attached to a robot arm.

In the following description, similar features in the drawings have been given similar reference numerals, and in order not to weigh down the figures, some elements are not referred to in some figures if they were already identified in a precedent figure.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements.

A tool 10 for layer depalletizing according to a first illustrative embodiment will now be described with reference to FIGS. 1 to 5.

As shown in FIG. 1, the tool 10 according to the first illustrative embodiment is operatively mounted to an industrial robot arm 12, which is conventionally coupled to a robot controller 14.

The expression "controller" should be construed broadly as including one or more electronic devices, including for example one or more computers that are configured with components and/or programmed with instructions that produce one or more functionalities, including controlling both a robot and a tool attached to the robot.

The robot 12 is in the form a standard industrial articulated robot arm suitable for the application. A conventional robot arm can be used, such as ABB's or IRB 760, FANUC's M410, or any similar robot arm offered by other manufacturers like Kuka or Motoman for example.

In the description and in the claim, the expressions 'robot' and 'robot arm' will be used interchangeably to mean a programmable system including articulated and/or movable members that can receive, control and move a tool.

Since the operation of a robot and of a robot controller is believed to be well known in the art, it will not be described herein in more detail for concision purposes.

As an input, a pallet (not shown), made of one or more layers 16 of products 18 (see FIG. 6B for example), is positioned in front of the robot 12. Slip sheets (not shown) can be present between the layers 16 of products 18. They can be removed with other means or left on the removed layer. The output includes one layer 16 removed from the pallet and placed for example on an outfeed conveyor (not shown).

In some embodiments, the slip sheet positioned above the layer of products is removed at the same time. In this case, the layer 16 is placed for example on an outfeed conveyor and the slip sheet is dropped in a bin (not shown).

Each layer 16 is made from a plurality of similar products 18 and each pallet is made of a plurality of layers 16. The products 18 can be similar or different from one layer 16 to the other. Also, the layers 16 can be full or partial, i.e. products can cover the complete surface of the layer 16 or some free space or openings can be found on the surface of the layer 16.

The expression "product" should be construed herein as including any type of case, carton, tray, shrink wrapped bundle or tray, etc. Generally, the product is of a rectangular shape. They can contain bottles, cans, pouches, bags, etc.

The product dimensions may vary greatly between each different type of product 18. For example, their height can be between 2" and 24".

The layer depalletizing tool 10 comprises a frame 20, four side clamps 22-24 movably mounted to the frame 20 to grip and release a pallet layer 16, two curtains 26 mounted to the frame under the clamps 22-24 to be inserted under a pallet layer 16 gripped by the clamps 22-24, and a top pad 28, mounted to the frame 20 above the clamps 22-24.

The frame 20 comprises two pairs of parallel walls 30-32 assembled so as to generally define a rectangular perimeter.

Each wall 30 and 32 includes a bottom rectangular portion 34 and 36 respectively and an integral triangular portion 38 and 40 respectively. The two triangular portions 40 are slightly bent toward each other.

The frame 20 further comprises two transversal rectangular hollow tubes 42 and 44, extending respectively parallel to the walls 30 between the walls 32, and parallel to the walls 32 between the walls 30. Holes 45 (see FIG. 6A) are provided near the top of the triangular portions 38-40 of the walls 30-32, where the hollow tubes 42 and 44 are secured, allowing passage for connectors and cables (not shown) through the walls 30-32 and then through the hollow tubes 42 and 44.

A mounting bracket 46 (see FIG. 6A) is secured to both hollow tubes 42 and 44, at the intersection thereof and that allows attaching the tool 10 to the robot arm 12.

The frame components 30-44 are assembled using fasteners and/or welding and so are other parts of the tool 10 that are mounted to the frame 20.

The frame 20 is not limited to the above-described embodiment and other members can be provided to mount the tool 10 to the robot arm 12 and to operatively receive the other components thereof.

Figure 4:
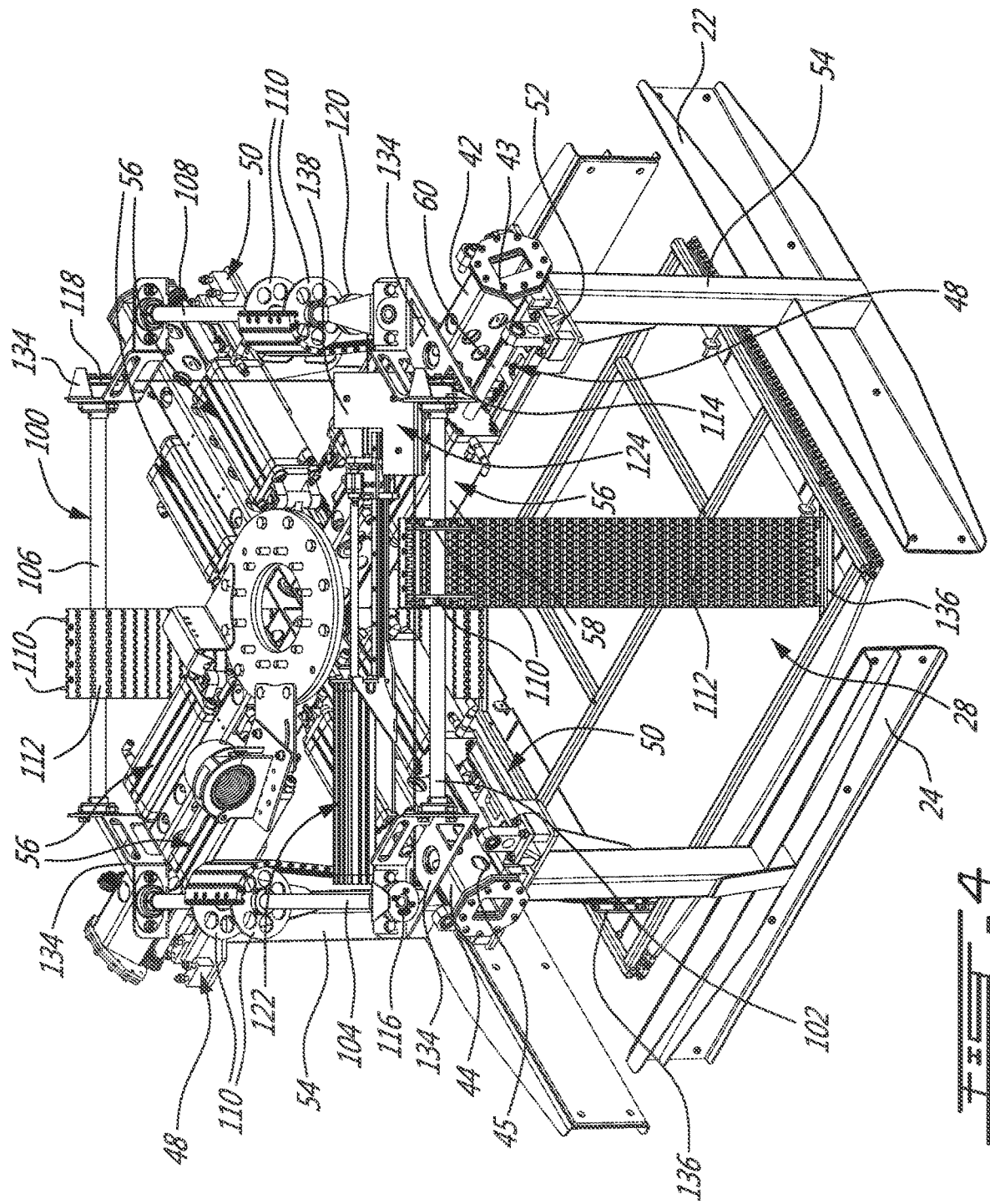
FIG. 4 is an exploded perspective of the tool from FIG. 1, the tool being shown without most of its frame.

As can be better seen in FIG. 4, each facing pair of side clamps 22 and 24 are slidably mounted to a respective track 43 and 45, each fixed respectively underneath hollow tubes 42 and 44 for movement therealong via mounting assemblies 48 and 50 respectively. Since the mounting assemblies 48 and 50 are very similar, only the mounting of one of the clamp 22 to the frame 20 will be described herein in more detail.

The mounting assembly 48 includes a bracket 52 that is slidably mounted to the hollow tube 42 via the track 43 thereunder, and attached to the distal ends of rods 60 of the two actuators 56. The bar 54 fixedly connects the clamp 22 to the bracket 52. The bar 54 is so mounted to the bracket 52 as to extend perpendicularly therefrom and to the clamp 22. The clamp 22 is perpendicular to the hollow tube 42 in a plane that includes the bar 54.

Two pneumatic actuators 56 are provided between the hollow tube 42 and the bracket 52 to cause movement thereof, and therefore also the movement of the clamp 22 along the hollow tube 42. More specifically, the body 58 of each actuator 56 is secured to the hollow tube 42 on respective lateral side thereof and the distal end of the rod 60 of the actuator is fixedly mounted to the bracket 52.

The clamps 22 and 24 are moved in parallel pair to grip a pallet layer from two opposite sides thereof and then from the other sides. The actuators 56 are therefore operated four (4) at first (secured on a same hollow tube 42 or 44), and then the other four simultaneously. According to another embodiment, all clamps 22 and 24 are actuated simultaneously.

Providing the nominal dimension of a pallet layer 16, each pair of clamps 22 and 24 are movable between an extended position to a retracted position where the clamps 22 or 24 apply a pressure onto the layer 16 from corresponding opposite sides, While the clamps 22 and 24 have different widths, clamps according to another embodiment may have the same width.

Clamps according to another embodiment (not shown) are pivotally mounted to the frame. According to other embodiment (not shown), the clamps have other configuration than those illustrated herein, and are mounted to the frame so as to be differently movable relative to the frame.

Figure 5:
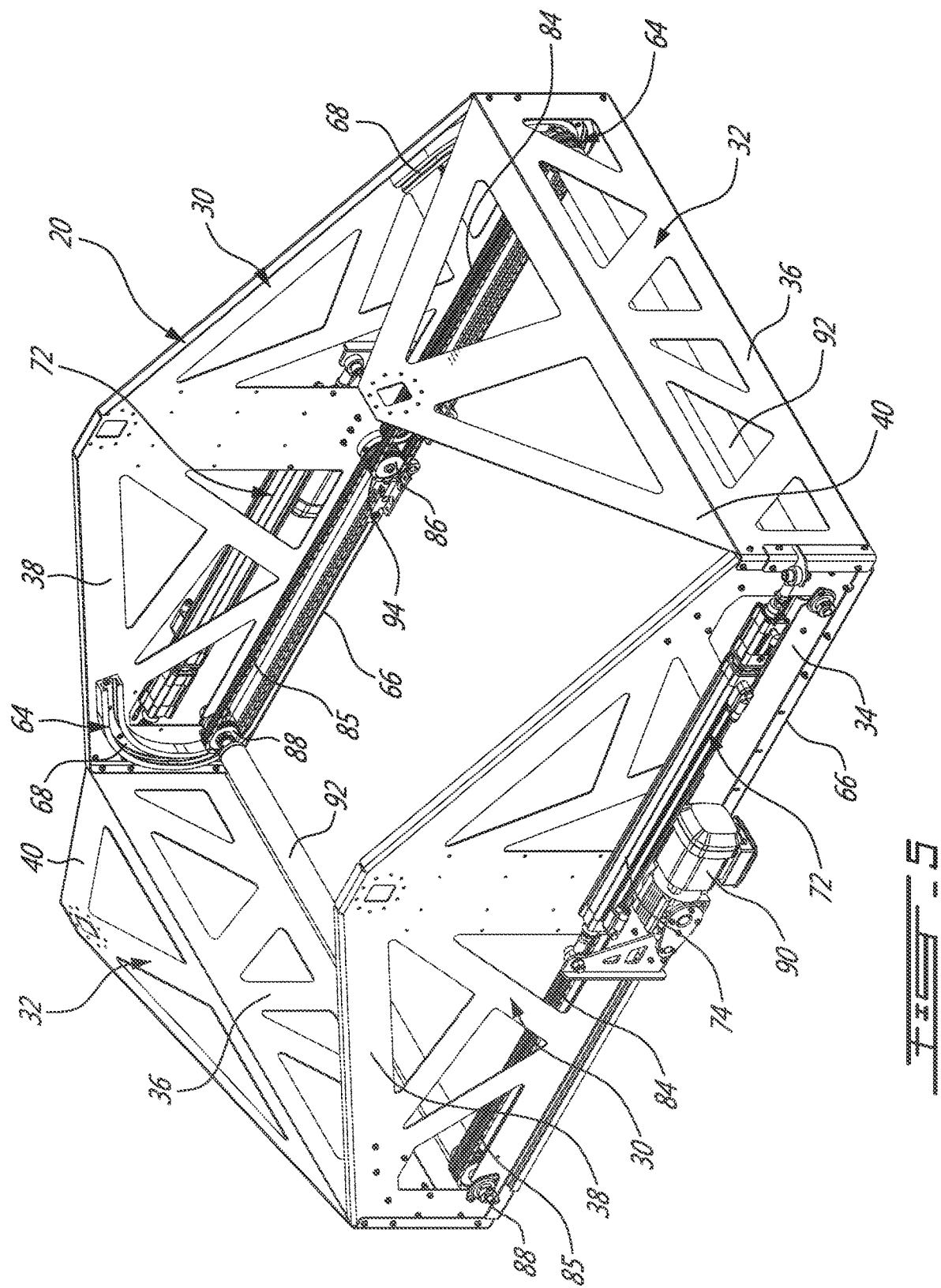
FIG. 5 is a top perspective of part of the frame and of the curtain actuating assembly.
Figure 7A:
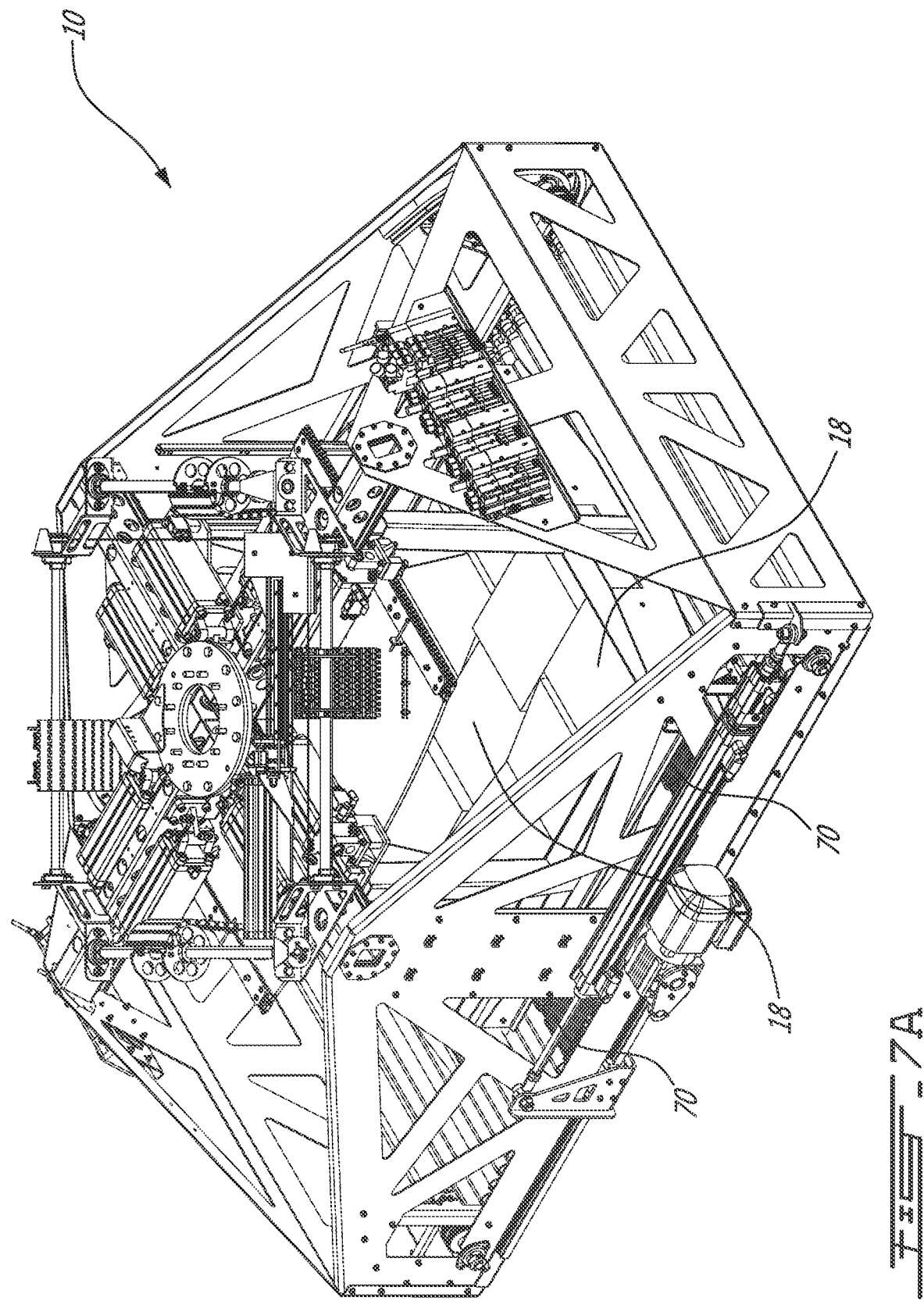

With reference to FIGS. 5, 7A and 8B, both curtains 26 are defined by a series or metallic rolls 62 that are both slidably and rotatably mounted to the rectangular portions 34 of the frame 20 therebetween. Together, both curtains 26 extend along the full length of the portions 34, each spanning half the length.

More specifically, each roll 62 is provided at its longitudinal ends with hub portions 63 (see FIG. 8B) that are received in parallel tracks 64 mounted to the inner face of the frame 10. Each of the four (4) tracks extends along the bottom edge 66 of the rectangular portion 34, from the center thereof to the end of an accurate portion 68 of the tracks 64 that raises towards the triangular portion 38 near the longitudinal end side of the wall 30. The arcuate portions 68 defines a curtain receiving portion when the curtains 26 are opened.

It is to be noted that, in some Figures, some of the rolls 62 are not shown to alleviate the views Each curtain 26 includes at its front end a rotating head 70, which is slidably mounted in the tracks 64 along with the rolls 62 and also rotatably mounted to the tracks 64.

The rolls 62, along with the head 70 of each curtain 26, are moved along their respective tracks 64 by an actuator 72. The body 74 of the actuator 72 is secured to the rectangular portion 34 of one of the wall 30 on the outer face thereof, and its rod 76 is fixedly mounted to the head 70 via a mounting bracket 78 (FIG. 7B) for translation of the head 70 in unison with the rod 76 along the track 79, which is attached to the outer face of the rectangular portion 34.

When the curtains 26 open, the actuators 72 pushes the heads 70 along the tracks 64 forces the rolls 62 in the same direction. When the curtains 26 close, the actuators 72 pulls the heads 70 along the tracks 64 in the same direction.

The heads 70 are in the form of a plurality of rotatable friction elements 80 extending along the front edge of each curtain 26. The friction elements 80 are in the form of rubber O-rings mounted onto two parallel rolls 82 for rotation thereon in an endless manner. The two rolls 82 are rotatably mounted to the mounting brackets 78 therebetween.

As can be better seen in FIGS. 5 and 7B, the two rolls 82 of each curtain 26 are driven by a drive assembly including i) one side chain 84 extending along the straight portion of respective tracks 64, and being mounted to a driving sprocket 86 and a driven sprocket 87, the later fixed at the end of each roll 82, ii) a drive 90 secured to the wall portion 34 and operatively coupled to one of the two chains 84 via a respective one of the driving sprockets 86. The chains 84 are so positioned relative to the two rolls 82 via the sprockets 87 so that rolls 82 and associated chains 84 rotate in unison. Rotation of each drive 90 therefore causes the rotation of the O-rings 80. A person skilled in the art will now appreciate that the head 70 can both rotate and slide along the tracks 64 at the same time and independently.

An end roll 92 is provided between the two driven sprockets 88 of each curtain 26 to further ease the displacement of the heads 70 along the tracks 64 by linking the chains 85 located at each end of the heads 70 therefore assuring that the heads 70 remain perpendicular to the tracks 64.

It is to be noted that elements of the drive assembly, including the belts 84 have been omitted in some drawings to alleviate the views.

Figure 2:
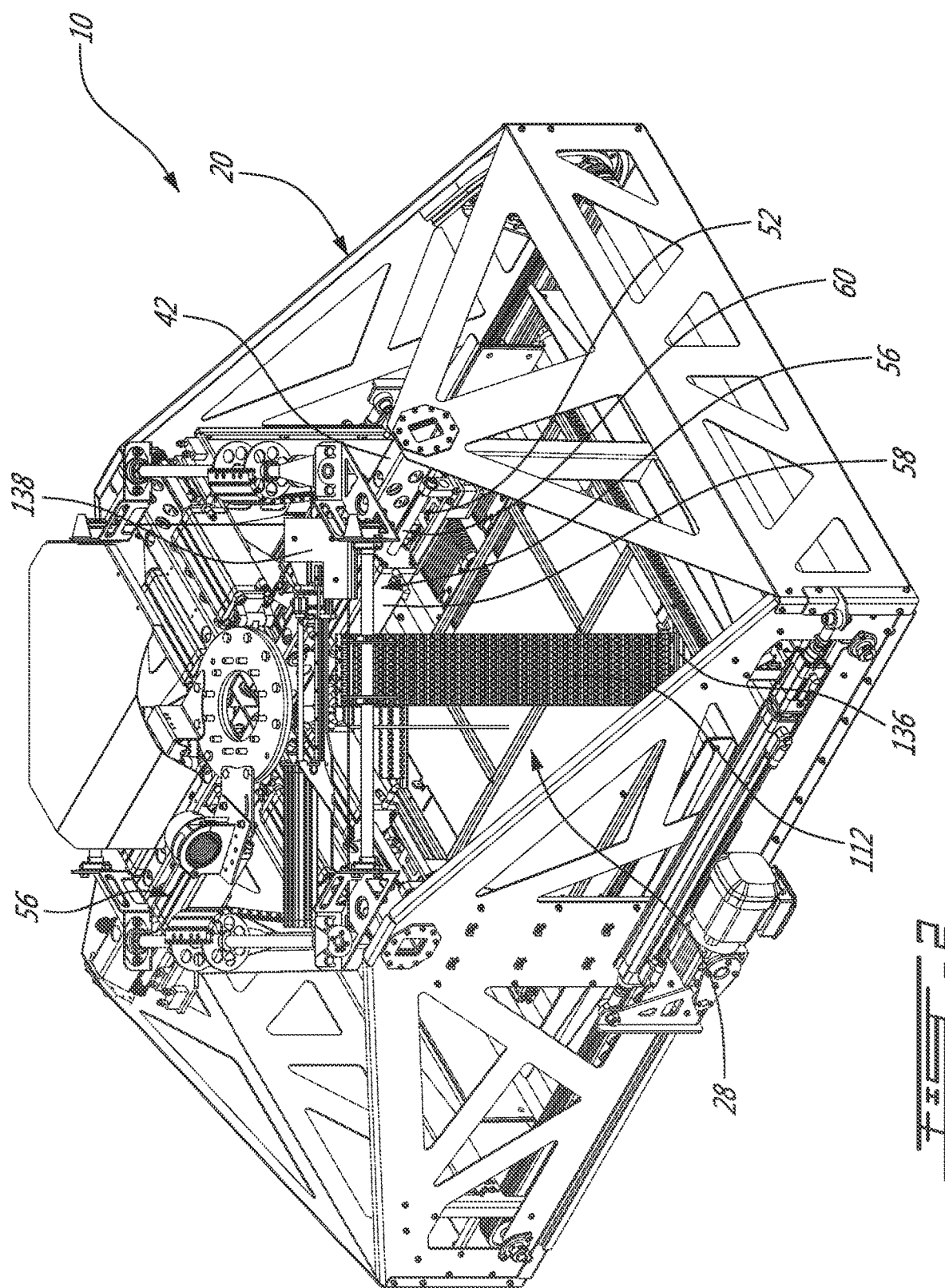
FIG. 2 is a top perspective of the tool from FIG. 1.
Figure 3:
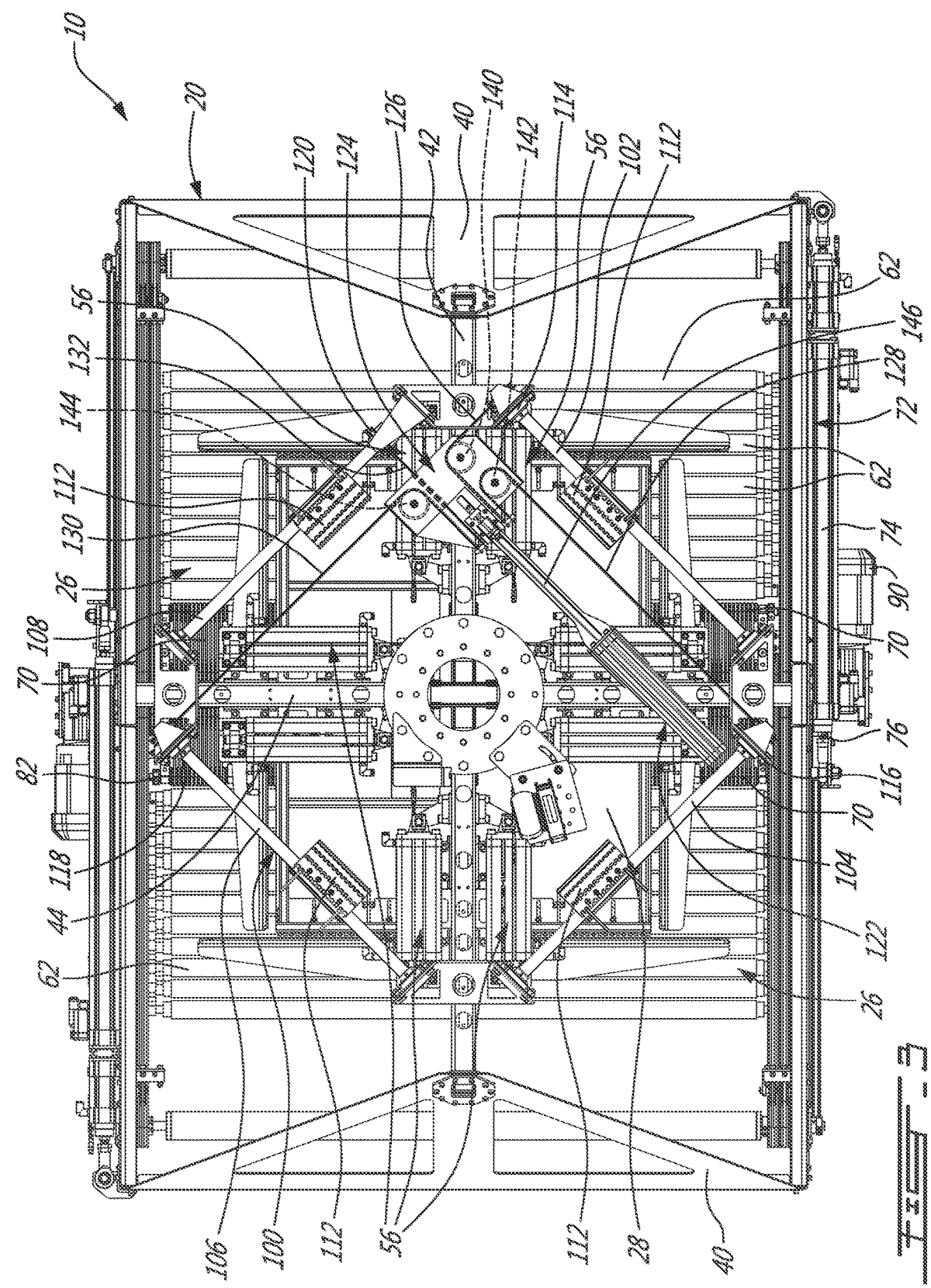
FIG. 3 is a top plan view of the tool from FIG. 1.

With reference more specifically to FIGS. 2-4, the top pad 28 and its actuating mechanism will now be described.

The top pad 28 is in the form of a plate that is movable towards and away a pallet layer 16 gripped by the clamps 22-24. The top pad 28 is made movable by its mounting to the frame 10 via a pad actuating assembly 100. The plate is made of a soft resilient material, such as rubber or plastic, which is reinforced on its non-contacting face with metal tubes. According to other embodiments, the pad 28 is made of another material and/or is not reinforced.

The pad actuating assembly 100 includes four pad holder shafts 102-108 that are rotatably mounted to the frame 20, eight pad holder wheels 110 mounted in parallel pairs on each shafts 102-108, four link elements 112, each secured to both the top pad 28 and the wheels 110 of a respective shaft 102-108 therebetween, four shaft pulleys 114-120, each one secured near one end of each shaft 102-108, a top pad linear actuator 122 secured to the frame 20, a pulley assembly 124 fixedly mounted to the frame 20, and four cables 126-132, each one operatively coupling a respective shaft pulley 114-120 to the movable end of the actuator 122.

The four pad holder shafts 102-108 are rotatably mounted to the hollow tubes 42-44 via four support brackets 134. Together the four shafts 102-108 are relatively positioned end to end in a square configuration.

Each link elements 112 is secured to a respective pair of wheels 110 for partial winding thereon and fixedly to the plate 28 via an attachment 136.

The pulley assembly 124 includes a support 138, secured to the hollow tube 42 so as to be positioned at the movable end of the actuator 122, and three (3) intermediary pulleys 140-144 rotatably mounted to the support 138 thereunder.

As can be better seen in FIG. 3, the intermediary pulleys 140-144 and the position and orientation of the actuator allows connecting the four shaft pulleys 114-120 to the actuator's rod 146 using the cables 126-132.

In operation, the top pad 28 is raised by causing the actuator 122 to retract its rod 146, thereby simultaneously pulling onto the cables 126-132. This causes the shafts 102-108 to simultaneously rotates, yielding a pulling force onto the link elements 112 that raises the top pad 28. The reverse effect is obtained by extending the actuator rod 146.

The operation of the tool 10 will now be described with reference to FIGS. 6A-8B and to FIG. 9, which describes a full layer depalletizing method 200 according to an illustrative embodiment.

When the robot controller 14 receives a signal indicative that a pallet layer 16 is ready to be picked (step 202), the controller 14 uses a received nominal position of the layer to be picked to command the robot 12 to position the tool 10 so that the clamps 22 and 24 surround the layer 16 (step 204) (see FIGS. 6A and 6B).

It is to be noted that, for most layer depalletizing tools, systems and methods from the prior art, the positioning of the tool relies solely on the nominal vertical position of the layer.

It is however known in the material handling industry that products 18 are often crushed within a pallet by the weight of the layer 16 or layers located above. This is of course particularly true for the last layers sitting directly on the pallet to be depalettized. Therefore, the nominal position of each layer 16, used in the initial programming of the robot 12, can lead to a wrong positioning of the tool, limiting the capacity of the system to adequately depalletize the layers 16.

The top pad 28 is coupled with a sensor (not shown) allowing to evaluate the real height/position of the top surface 148 of the layer 16 being picked, therefore enabling the tool 10 to be positioned more precisely. This added precision enables the depalletizing system, including the robot 12 and tool 10, to be more efficient and reduces the probability of product damages or even avoid cases where the bad positioning prevents the products 18 of being depalettized.

The sensor can be in the form of an analog laser distance sensor or any other similar means.

In step 206, the top pad 28 is lowered and positioned over the top layer on the pallet.

The robot 12 positions the tool 10 to the theoretical height of the layer 16 to be picked. Knowing that the top pad 28 contacts the upper surface of the layer 16, the sensor measures its position. The controller 14 then computes the real height of the layer 16 with the theoretical height and, if necessary, adjusts the tool 10 position accordingly.

Using the top pad 28 to determine the real height of the top surface of the pallet represents a robust way to achieve this task. For example, even if a flap of a product 18 is lifted or a product 18 is not well positioned, the top pad's overall position is not affected and will therefore provide a valuable and precise information about the real height of the layer 16. When needed, the robot 12 adjusts the height of the tool 10 (step 210).

Considering that each layer 16 can be composed of a plurality of products 18, it often happens that some products 18 have no side facing the exterior of the layer. According to the first illustrative embodiment, a combination of mechanisms is provided that allows the clamps to grip them adequately.

First, the four clamps (22-24) are used to compress the whole layer on each side without horizontally moving the layer (step 212) by activating and controlling the pneumatic actuators 56.

The robot 12 then slightly lifts the tool 10 to create a gap mainly between the lower surfaces 150 of the products 18 located on the perimeter of the layer 16 and the top surface of the products 18 of the layer 16 just underneath (step 214).

The closing of the horizontal curtains 26 is then initiated so that they are inserted under the layer 16 (step 216). This step is illustrated in FIGS. 7A and 7B.

The rotating friction heads 70 of the curtains 26 contribute to move the products 18 from the gripped layer 16 over the horizontal curtains 26. This more specifically allows the products 18 that are not located on the perimeter of the layer 16 and that are generally only partially lifted by the side clamps 22-24 or sometimes not lifted at all to move over the horizontal curtains 26.

The friction created on the vertical faces of the products 18 by the pressure of the clamps 22-24 sometimes prevents the products 18 to move upward to enable the horizontal curtains 26 to close underneath without damaging the products 18. When this happens, the pressure is automatically reduced on the side clamps 22-24 so the above mentioned friction is also reduced, therefore facilitating the movement of the curtains 26 to lift and pick the remaining products 18 of the layer 16 to be picked.

Variation on the pressure of the clamps 22-24 is adjusted, in step 218, by monitoring the linear movement of the horizontal curtains 26. If a product 18 prevents this movement, the horizontal curtains 26 cannot move forward. When this happens, it is concluded that at least one product 18 is blocking the movement. Therefore, the pressure is reduced on the clamps 22-24 by the actuators 56 (step 220) to continue with the process of picking all the products 18 on the layer 16.

According to another embodiment, the linear movement of the curtains 26 is monitored so as to detect a movement resistance thereof even when the curtains continue to move.

When the curtains 26 are completely closed (see FIGS. 8A-8B), the layer is completely gripped by the tool 10 (step 222), and the robot 12 moves the tool 10 with the gripped layer 16 and transfers the layer 16 to an outfeed location and the method continues with step 204.

In addition to the above-described function of allowing a precise assessment of the position of the top layer 16 of the pallet, the top pad 28 also prevents that small products 18 ""pop out" of the layer 16 as the horizontal curtains 26 move underneath. Such movement of products 18 would occur for example when the layer 16 is composed of small products 18, i.e. products 18 with reduced height. The weight of the top pad 28 is sufficient to prevent the "pop out" effect of small products without limiting the capacity of the horizontal curtains 26 to go underneath them. Similarly, the top pad 28 prevents the small products 18 to "pop out" when the horizontal curtains 26 are removed from underneath the products 18.

In some applications, slip sheets (not shown) are provided between some layers 16 of products 18 in a pallet. A standard approach is to have an independent device that automatically removes the slip sheets between each layer depalletizing sequence. This approach works well but is quite expensive considering the addition of the independent device.

According to a further embodiment (not shown), the tool for layer depalletizing is provided with a component that retrieves a slip sheet (not shown) located over the layer 16 of products 18 at the same time the layer 16 is depalettized.

Since such a tool is similar to the tool 10, and since this further method is similar to the method 200, for concision purposes, only the differences therebetween will be described with reference to FIG. 9.

The tool includes a top pad including suction cups (not shown) to remove any slip sheet over the layer 16 at the same time the layer 16 is depalettized. When the layer 16 is completely gripped by the tool (step 222), the suction cups are activated (step 224). Another laser sensor (not shown), which is facing downward towards the gripped pallet, or the same referred to hereinabove, is used to determine if there is a slip sheet attached to the top pad 28. As the robot 12 lifts and transfers the layer 16, the top pad 28 is slightly lifted (step 226). If the laser sensor still detects the presence of an object (step 228), this means that there is a slip sheet over the layer 16 being depalettized (step 229) and the vacuum is kept on the suction cups (step 230). The robot 12 then drops the slip sheet in a bin (236) after the layer 16 is placed on the outfeed conveyor (step 232) or somewhere else. In the contrary, if the sensor does not detect anything, this means that there is no slip sheet over the layer being depalettized. When such is the case, the vacuum is removed from the suction cups and the robot 12 directly moves back to pick the next layer 16 on the pallet once the previous layer 16 is placed on the outfeed conveyor (step 238).

Turning now to FIG. 10, a further embodiment of the clamps 322 and 324 will now be described briefly. The clamps 322-324 are adapted for at least two different lengths and at least two different widths of pallet layers 16. According to this embodiment, the lateral side portions of the clamps 322 and 324 are provided with respective fingers 326 and 328 that allows a first positioning of the clamps 322-324 for smaller pallet layers, wherein the fingers 326 and 328 are completely interlaced, i.e. two adjacent clamps 322 and 324 intersect near the proximate ends of their fingers 326 and 328. A second positioning of the clamps 322-324 is further allowed for bigger pallet layers (not shown), wherein there is no interlacing between two adjacent clamps 322 and 324. The clamps 322-324 can also take intermediary positions wherein there is partial interlacing between two adjacent clamps 322 and 324.

In such an embodiment of the clamps 322-324, double stroke actuators (not shown) are used instead of the single stroke actuators 56. When a smaller size pallet is depalettized, one stroke action of the double stroke actuator is kept retracted and only the other stroke action is used to open or closed the clamps. Such a shorter stroke movement reduces the travel of the clamps 322-324, and thus the cycle time.

When a larger size pallet is depalettized, one stroke action of the double stroke actuator is kept extended and only the other stroke action is used to open or closed the clamps.

According to another embodiment, the layer depalletizing tool can grip more than one layer, depending of the products' height and weight and the size of the clamps.

It is to be noted that many other modifications could be made to the depalletizing tools and methods described hereinabove and illustrated in the appended drawings. For example:
- the robot arm can be replaced by a gantry type equipment or any other similar means;
- the layer can be placed on an output conveyor, a pallet, a table, a platform, an AGV or any other means that can accept the layer;
- in some applications, the tool is provided with only one pair of facing clamps;
- the shape and length of the clamps may be different than those illustrated;
- other friction reducing elements than the rotating heads 70 can be used in the front end of the horizontal curtains;
- the mechanism to move the top pad towards and away the gripped pallet can be different than illustrated and so is the pad;
- the various actuators to move the top pad, the side clamps and the curtains can be pneumatic, electric, servo driven or any other way;
- other devices than a laser sensor can be used to confirm the presence of a slip sheet when a layer is being depalettized.

It is to be understood that embodiments of the layer depalletizing tool are not limited in their application to the details of construction and parts illustrated in the accompanying drawings and described hereinabove.

Other embodiments can be foreseen and practiced in various ways. It is also to be understood that the phraseology or terminology used herein is for the purpose of description and not limitation.

What is claimed is:

1. A tool for layer depalletizing comprising:
a frame for mounting the tool to a robot;
clamps movably mounted to the frame to grip a pallet layer; and
a pad, mounted to the frame above the clamps, and transversely movable with a controller towards and away a level defined by the clamps, and that defines a reference surface for the controller determination of a real height of the pallet layer by the pad moved by the controller towards the pallet layer.

2. The tool as recited in claim 1, wherein the pad is movable with the controller via a pad actuating assembly including:
at least one shaft rotatably mounted to the frame;
at least one link coupling the pad at a first end and to the at least one shaft at a second end;
an actuator secured to the frame and operatively coupled to the at least one shaft; and a sensor coupled to the actuator so as to effect determination of the height of the pallet layer when the pad is moved towards the pallet layer.

3. The tool as recited in claim 1, wherein the pad includes suction elements to handle a slip sheet.

4. A method for layer depalletizing comprising:
moving a pad, with a controller, towards a top surface of the layer where the pad defines a reference surface for the controller determination of a real position of the top surface of the layer by the pad moved by the controller towards the layer;
positioning clamps around the layer using the real position of the layer;
using the clamps to grip and at least partially lift the layer;
moving curtains under the layer;
moving the layer with the clamps to a first area, while the curtains are maintained under the layer; and
at the first area, removing the curtains from under the layer and the clamps releasing the layer.

5. The method as recited in claim 4, further comprising verifying a presence of a slip sheet on the layer and if a slip sheet is detected, then dropping the slip sheet at a second area.

6. The method as recited in claim 5, wherein verifying a presence of a slip sheet includes:
lifting the layer while creating a vacuum thereunder and monitoring a distance of an object under the pad when the layer is lifted; and
a non-variation of the distance being indicative of the presence of a slip sheet.

7. The method as recited in claim 4, wherein:
said by moving the pad towards a top surface of the layer includes further moving a location sensor in unison with the pad;
the location sensor being positioned behind the pad with regards to the layer while both the pad and sensor are moving;
the location sensor monitoring its relative position with the pad; and
the real position of the layer being determined as corresponding to a position of the pad when the relative position of the sensor with the pad changes.

8. The method as recited in claim 4, wherein the curtain is slidably mounted to the frame.

9. The method as recited in claim 4, wherein the curtain is slidably mounted in tracks secured to the frame.

10. The method as recited in claim 9, moving the curtain with at least one actuator.

11. The method as recited in claim 4, wherein the clamps are slidably mounted to the frame.

12. A tool for layer depalletizing comprising:
a frame for mounting the tool to a robot;
a sensor movably mounted to the frame, the sensor being configured for sensing a real position of a layer by moving relative to the frame towards a top surface of the layer; and
clamps movably mounted to the frame and arranged around the layer, the clamps being configured to grip the layer based on the sensed real position of the layer.

13. The tool as recited in claim 12, further comprising curtains movably mounted to the frame and being configured to be placed under the layer so that when moving the layer with the clamps to a first area, the curtains are maintained under the layer, wherein at the first area, the curtains are removed from under the layer and the clamps release the layer.

14. The tool as recited in claim 13, wherein the curtain is slidably mounted to the frame.

15. The tool as recited in claim 13, wherein the curtain is slidably mounted in tracks secured to the frame.

16. The tool as recited in claim 15, wherein the curtain is made movable by at least one actuator.

17. The tool as recited in claim 12, wherein the clamps are configured to at least partially lift the layer gripped thereby.

18. The tool as recited in claim 12, further comprising a controller configured to verify a presence of a slip sheet on the layer and if a slip sheet is detected, then dropping the slip sheet at a second area.

19. The tool as recited in claim 18, wherein verifying a presence of a slip sheet includes:
lifting the layer while creating a vacuum thereunder and monitoring a distance of an object under the sensor when the layer is lifted; and
a non-variation of the distance being indicative of the presence of a slip sheet.

20. The tool as recited in claim 12, wherein the sensor is positioned behind a pad so as to move in unison with the pad to monitor a relative position of the pad.

21. The tool as recited in claim 20, wherein the real position of the layer being sensed corresponds to a position of the pad when the relative position of the sensor with the pad changes.

22. The tool as recited in claim 12, wherein the clamps are slidably mounted to the frame.

* * * * *